US009404998B2

(12) United States Patent
Larose et al.

(10) Patent No.: US 9,404,998 B2
(45) Date of Patent: Aug. 2, 2016

(54) COMPUTERIZED DEVICE FOR OBJECT LOCATING SYSTEM AND METHOD THEREOF

(71) Applicant: Secure Care Products, LLC, Concord, NH (US)

(72) Inventors: Albert Larose, Dracut, MA (US); Doug Richard, Tilton, NH (US); Matthew Cammack, Weare, NH (US); Christopher D. Stevens, Belmont, NH (US); Mike Singer, Concord, NH (US); Sam Corliss, Concord, NH (US); Vijaya Kodali, Nashua, NH (US); Ray Scott, Webster, NH (US)

(73) Assignee: Secure Care Products, LLC, Concord, NH (US)

( * ) Notice: Subject to any disclaimer, the term of this patent is extended or adjusted under 35 U.S.C. 154(b) by 255 days.

(21) Appl. No.: 14/242,297

(22) Filed: Apr. 1, 2014

(65) Prior Publication Data

US 2014/0210671 A1    Jul. 31, 2014

Related U.S. Application Data

(63) Continuation-in-part of application No. 13/426,052, filed on Mar. 21, 2012, now Pat. No. 9,069,057.

(51) Int. Cl.
*G01S 3/02* (2006.01)
*G01S 5/14* (2006.01)
*G01S 5/06* (2006.01)

(52) U.S. Cl.
CPC .... *G01S 5/14* (2013.01); *G01S 5/06* (2013.01)

(58) Field of Classification Search
CPC ................................ G01S 1/02; H04W 64/00
USPC ................. 342/387, 444, 450, 457, 463–465; 455/456.1, 457
See application file for complete search history.

(56) References Cited

U.S. PATENT DOCUMENTS 6,233,459 B1    5/2001   Sullivan et al.
9,069,057 B1 *  6/2015   Larose ..................... G01S 5/06

* cited by examiner

*Primary Examiner* — Dao Phan
(74) *Attorney, Agent, or Firm* — Hayes Soloway, P.C.

(57) ABSTRACT

A computerized device for use with an object location system and method thereof is provided. The computerized device includes at least one processor in communication with a memory device, the memory device storing a quantity of programmable code having a plurality of processor-executable instructions. A communication element is connected between the processor and at least one monitoring unit. The at least one monitoring unit is positioned remote from the computerized device and a locating circuit substantially secured to an object intermittently communicates an omnidirectional signal to the at least one monitoring unit. A calculator is in communication with the processor. The calculator directs the processor to determine a duration of transmission time of the omnidirectional signal communicated from the locating circuit to the at least one monitoring unit directs the processor to calculate a location of the locating circuit using the determined duration of transmission time of the omnidirectional signal.

20 Claims, 4 Drawing Sheets

COMPUTERIZED DEVICE FOR OBJECT LOCATING SYSTEM AND METHOD THEREOF

CROSS REFERENCE TO RELATED APPLICATION

This application is a continuation-in-part application of U.S. application Ser. No. 13/426,052 filed Mar. 21, 2012, the entire disclosure of which is incorporated herein by reference.

FIELD OF THE DISCLOSURE

The present disclosure is generally related to computerized systems and more particularly is related to a computerized device for use with an object locating system and method thereof.

BACKGROUND OF THE DISCLOSURE

Determining the location of an object or a person within or proximate to a structure is a feature that many industries, companies and individuals desire. Within various industries, determining the location of an object in a timely and accurate manner may save money and time, but may also minimize the risk of injury or a security breach. For example, in today's hospitals and medical facilities locating systems are used to determine the approximate location of infants and the elderly. When a baby is born, a security tag is attached to their leg to prevent abduction of the infant during their stay at the hospital. When an abductor attempts to remove the infant from the hospital, proximity sensors may signal an alarm to sound. Similar systems are used in nursing homes to prevent residents with mental handicaps from exiting the building without authorization. Many industries do not have locating systems in use, due to their expense and inconvenience in using them. For example, malls and shopping centers commonly only provide stationary maps with an indication of where the map is located relative to the building.

These current systems may include a real-time locating system (RTLS), which may facilitate locating an object within a building. These systems operate by utilizing a number of different techniques, including sending pinging signals, RFID technology, ultrasound and other conventional locating technologies. Similarly, GPS may be used for locating objects in certain instances. However, these current systems are expensive and may only work under specific conditions. For example, GPS may fail to work when the satellite signal is lost, such as when the GPS receiver is within a tunnel. Likewise, the proximity sensors used in hospitals may only indicate the presence of a security tag, and fail to provide any further information.

Thus, a heretofore unaddressed need exists in the industry to address the aforementioned deficiencies and inadequacies.

SUMMARY OF THE DISCLOSURE

Embodiments of the present disclosure provide a system and method for a computerized device for use with an object location system. Briefly described, in architecture, one embodiment of the device, among others, can be implemented as follows. At least one processor is in communication with a memory device, the memory device storing a quantity of programmable code having a plurality of processor-executable instructions. A communication element is connected between the processor and at least one monitoring unit, wherein the at least one monitoring unit is positioned remote from the computerized device, and wherein a locating circuit substantially secured to an object intermittently communicates an omnidirectional signal to the at least one monitoring unit. A calculator is in communication with the processor, wherein the calculator directs the processor to determine a duration of transmission time of the omnidirectional signal communicated from the locating circuit to the at least one monitoring unit directs the processor to calculate a location of the locating circuit using the determined duration of transmission time of the omnidirectional signal.

The present disclosure can also be viewed as providing methods for controlling an object location system with a computerized device. In this regard, one embodiment of such a method, among others, can be broadly summarized by the following steps: connecting a communication element between a processor and at least one monitoring unit, wherein the processor is in communication with a memory device; storing a quantity of programmable code within the memory device, wherein the quantity of programmable code has a plurality of processor-executable instructions; intermittently communicating an omnidirectional signal from at least one locating circuit substantially secured to an object to the at least one monitoring unit, wherein the at least one monitoring unit is positioned remote from the computerized device; directing the processor to determine a duration of transmission time of the omnidirectional signal communicated from the locating circuit to the at least one monitoring unit; and directing the processor to calculate a location of the locating circuit using the determined duration of transmission time of the omnidirectional signal.

The present disclosure can also be viewed as providing methods using a programmable system for locating an object. In this regard, one embodiment of such a method, among others, can be broadly summarized by the following steps: providing a processor in communication with a memory device, the processor executing a quantity of programmable code portions stored at least partially within the memory device; executing with the processor a first programmable code portion for initiating a communication connection between the processor and at least one monitoring unit; executing with the processor a second programmable code portion for determining a duration of transmission time of an omnidirectional signal communicated from a locating circuit to the at least one monitoring unit; and executing with the processor a third programmable code portion for calculating a location of the locating circuit using the determined duration of transmission time of the omnidirectional signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
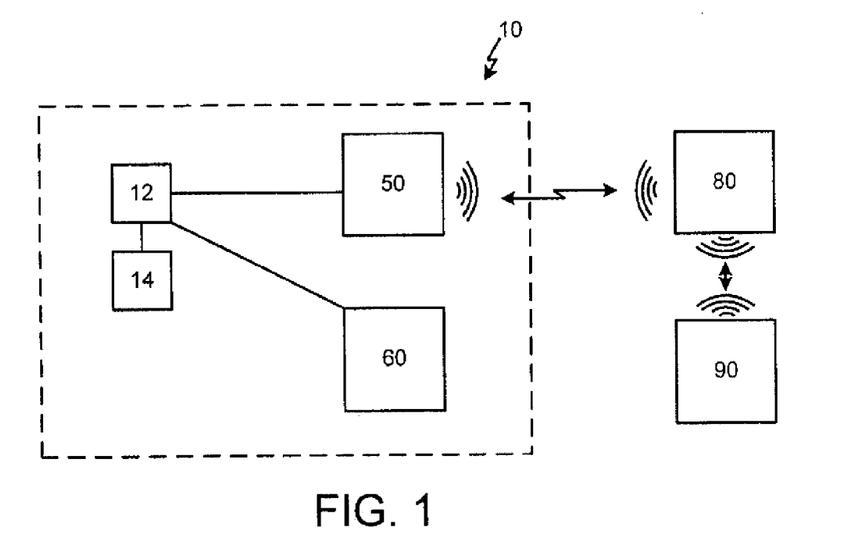
FIG. 1 is a schematic illustration of a computerized device for use with an object location system, in accordance with a first exemplary embodiment of the present disclosure.

FIG. 1 is a schematic illustration of a computerized device 10 for use with an object location system, in accordance with a first exemplary embodiment of the present disclosure. The computerized device 10 includes at least one processor 12 in communication with a memory device 14, which may include an executable file. The memory device 14 may include a tangible or non-transitory memory unit that stores a quantity of programmable code having a plurality of processor-executable instructions. A communication element 50 is connected between the processor 12 and at least one monitoring unit 80. The at least one monitoring unit 80 is positioned remote from the computerized device 10. A locating circuit 90 substantially secured to an object intermittently communicates an omnidirectional signal to the at least one monitoring unit 80. A calculator 60 in communication with the processor 12, wherein the calculator 60 directs the processor 12 to determine a duration of transmission time of the omnidirectional signal communicated from the locating circuit 90 to the at least one monitoring unit 80 and directs the processor 12 to calculate a location of the locating circuit 90 using the determined duration of transmission time of the omnidirectional signal.

The computerized device 10 is for use with an object location system, which may be referred to herein simply as the 'computerized device 10,' may include any system that is capable of locating an object, tracking an object, or otherwise identifying a location of an object. The object location system may be used in a variety of industries where it is desirable to locate and track an object. In many settings, such as the health care industry, for example, it is desirable to know where a specific object is located at a specific time, whether an individual or a medical device. Conventional systems used within certain industries today, like the health care industry, generally include devices that utilize a plurality of transmitters affixed to people or objects and a plurality of proximity sensors that sense when the transmitter is located nearby. These devices are commonly used to prevent the unauthorized transportation of an infant within a maternity ward of a hospital, or the unauthorized exit of an elder care facility by a resident. Although these devices are successful at detecting the proximity of a transmitter to an access point, they fall short of providing a significant amount of other information that is pertinent to the location of the human or object.

For example, conventional locating devices are only capable of determining a location of the transmitter relative to the proximity sensor. Accordingly, a proximity sensor on an exit or entrance doorway may be able to sense a nearby transmitter, but it is incapable of determining whether the transmitter is located on the exit side of the doorway or the entrance side of the doorway. Likewise, in a multi-story building, a doorway proximity sensor on the third floor may detect a transmitter that is located on the fourth floor, directly above the doorway proximity sensor's location on the third floor. This may result in many false positive determinations of locations, i.e., an indication that the transmitter is about to be moved through the doorway, when in fact it is not even on the same floor as the doorway. The computerized device 10 for use with the object location system, described herein, may replace and/or work in conjunction with these conventional locating devices.

The computerized device 10 and object location system is described in the context of the health care industry, which may include hospitals, medical centers, doctors offices, nursing homes, retirement homes and any other medical facility. The computerized device 10 and object location system, however, may be useful in other settings too, such as at-home medical applications, medical rehabilitation applications, and physical therapy applications, just to name a few. The disclosure with reference to the health care industry, in accordance with the first embodiment, and all additional embodiments, should not be limiting to use of the computerized device 10 for use with a object location system in other industries or settings. For example, the computerized device 10 may also be used in the retail industry, entertainment industry, etc., without reservations.

The computerized device 10 may be considered a real-time locating system (RTLS), which may be used to locate, track and identify an object in real time. In accordance with this disclosure, "real-time" as used with a RTLS may be characterized as occurring at substantially an actual and true time or event, or in occurrence with the specific time of an actual event occurring. In other words, the computerized device 10 may be capable of determining a location of an object in such a brief time period that the location of the object that the computerized device 10 provides is substantially the same as the location of the object when it is first sensed or determined by the computerized device 10. However, as those skilled in the art are aware, various factors may cause slight delays or insignificant changes in a RTLS system. These may include delays of fractions of a second due to computer processing, device functions, transmission times, and similar factors. These delays or changes in a RTLS are expected and do not hinder the functionality of the RTLS.

The computerized device 10 may be used to locate any number or type of objects, which may include locating human beings, movable or non-movable equipment, packages in transportation or storage, or any other type of object. For example, the computerized device 10 may locate a patient or a doctor within a medical facility, a wheelchair being used to transport a patient, a package of medicine in storage or a visitor to a medical facility. In other industries, the computerized device 10 may be capable of locating any type of object or entity within any type of structure, regardless of the size of the object, the movement of the object or the size of facility. In accordance with this disclosure, the object may include any device, entity or article, living or non-living, movable or stationary, or any combination thereof. As will be described in more detail, the computerized device 10 may have many potential uses and offer many benefits.

The computerized device 10 includes at least one processor 12 in communication with a memory device 14, which stores a quantity of programmable code having a plurality of processor-executable instructions, including a plurality of executable files. The processor 12 and memory device 14 may include any conventional computer processor and computerized system, many of which are known in the art, as is further described with respect to FIG. 2. The computerized device 10 may further include additional computer components, also described with respect to FIG. 2. Preferably, the computerized device 10 includes a computer system, server, or other stationary or mobile computer in communication with other devices. For example, within hospitals, computer systems or servers are used to perform an array of functions many of which include communication with other devices. The computerized device 10 may be integral with an existing computer system within a facility, may be an additional component to an existing computer system, or may be an independent system. For example, it may be preferable for the computerized device 10 to be independent of other computer systems, such as to prevent undesirable accessing of information, transfer of virus, or another undesirable act.

A communication element 50 is connected between the processor 12 and at least one monitoring unit 80. The communication element 50 may include any communication device, such as any input/output (I/O) device using a wired or wireless communication connection. For example, the communication element may include a transmitter for transmitting a signal, a receiver for receiving a signal, or a transceiver for transmitting and receiving a signal. The communication element 50 may include any number or type of components to provide successful communication between the processor 12 and the at least one monitoring unit 80. In addition, the communication element 50 may include communication connections with other components of the computerized device 10, or devices external to the computerized device. For example, the communication element 50 may be in direct communication with the locating circuit 90, the Internet, or a facility computer system. In accordance with the disclosure, a communication connection may include any direct or non-direct, wired or wireless, electronic, optical, or physical connection that is capable of communicating data.

The computerized device 10 is for use with an object locating system, which generally includes at least one monitoring unit 80, which is positioned remote from the computerized device 10. The monitoring unit 80 receives communications via an omnidirectional signal from a locating circuit 90, which is substantially secured to an object. In addition to the monitoring unit 80 and the locating circuit 90, the object locating system may also include additional components without restriction. However, for clarity of discussion, the computerized device 10 is described only with reference to the monitoring unit 80 and the locating circuit 90.

The locating circuit 90 is capable of working in conjunction with other components of the object locating system or the computerized device 10, to locate an object that the locating circuit 90 is secured to. When the object location system is in use, the locating circuit 90 should correspond to the location of the object, whether generally corresponding or specifically affixed thereto. For example, the locating circuit 90 may generally correspond to the object if it is secured to the exterior of a box or container that houses the object. Alternatively, the locating circuit 90 may be specifically secured to the object. In accordance with this disclosure, the locating circuit 90 may correspond to the location of the object by any number of ways, including a locating circuit 90 that is secured to, located on, positioned with or otherwise associated with the object directly and/or a container or packaging housing the object. The locating circuit 90 may continue to correspond to the location of the object while the object location system is in use, i.e., until the locating circuit 90 is removed from its location proximate to the object. Any other configurations for corresponding the location of the locating circuit 90 with the location of the object may also be used, all of which are considered within the scope of the present disclosure.

The locating circuit 90 may be permanently secured to the object or removably secured to the object, which may depend on the type of object. For example, the locating circuit 90 may be integral with a band (wrist, ankle or other appendage), an identification badge, or another wearable article that is removably secured to a human being. The human being, who may be a patient, doctor or visitor of a hospital or medical facility, may secure the wearable article having the locating circuit 90 on their person for a predetermined shortened period of time, i.e., a work shift, or for a long period of time, such as an extended hospital stay. For example, the object location system may be used within a hospital maternity ward, wherein the locating circuit 90 is affixed to the leg of a newborn child with an ankle band soon after the child is born. In another example, a locating circuit 90 may be embedded within the ID badge of a doctor, thereby allowing the doctor's location within the hospital to be known by the object location system.

The locating circuit 90 may include one or a variety of different types of circuits, transmitters, transmitting devices, computerized chips, computer-compatible chips, or other electronic circuitry. The number and type of circuits included with the locating circuit 90 is dependent on the design and functionality of the locating circuit 90, all of which are considered within the scope of the present disclosure. The locating circuit 90 may be compatible with any of the applicable Institute of Electrical and Electronics Engineers (IEEE) standards and may be compatible with ultra-wideband (UWB) technology, wherein the locating circuit 90 may run on a low power supply, such as a small battery, and be used at low energy levels for short-range, high-bandwidth communications. For example, the locating circuit 90 may be compatible with IEEE 802.15.4a UWB, any WIFI™ enabled device, or any other communication medium. As an example, one type of locating circuit 90 may be a 802.15.4a UWB chip.

The locating circuit 90 may include many other characteristics or features to enhance the utility of the object location system. For example, the locating circuit 90 may have a small size, thereby allowing it to fit within various wristbands, ankle bands or other articles that are secured to an object. This may include a locating circuit 90 with a size of approximately 7.0 sq mm, but may also include sizes smaller or larger than 7.0 sq mm. The locating circuit 90 may be small enough to be easily attached to an object with many types of fasteners, including adhesives, mechanical fasteners, hook and loop fasteners, with integral connections or any other connections or fasteners available. The locating circuit 90 may also run on any type of power source, and may commonly only require a minimal amount of power that can be supplied by a battery. The locating circuit 90 may run on any type of battery, including any electrochemical device such as button cell batteries, AAA, AA, 9V, or another type of battery. The battery may be rechargeable, non-rechargeable, replaceable or irreplaceable, depending on the design of the locating circuit 90. Preferably, the locating circuit 90 may use a very low amount of power, such as provided from a button cell battery, which may allow the locating circuit 90 to be operational for substantially longer time than conventional chips. For example, the locating circuit 90 may be operational for any number of hours, days, weeks or even years without replacing or recharging the battery, whereas some conventional chips may require recharging daily or weekly.

The monitoring units 80 are each located within a facility, such as within a hospital or other building, as part of stationary or mobile programmable devices. Additionally, the monitoring units 80 may be located external to a building or facility, or in a structure that is at least partially exposed to an outside atmosphere, such as an open-air stadium. As discussed previously, the object location system is described herein in relation to health care facilities, such as hospitals, but the object location system may be used with any facility, including retail facilities, entertainment facilities, enclosed facilities, semi-enclosed facilities, open-air facilities, or any other structure. Generally, the number of monitoring units 80 used with the object location system will be dependent on the type and size of the facility, as well as the intended use of the object location system and the volume of objects 12 being located. Any number of monitoring units 80 may be included with the object location system, as may depend on the design of the object location system. For example, small facilities may only require a small number of monitoring units 80, whereas larger, multi-storied facilities may require many monitoring units 80.

The monitoring units 80 may be located in a position that is remote from the locating circuit 90. This may include any position that is at least a few centimeters from the locating circuit 90, but may commonly include positions that are more than a few centimeters, more than a meter, more than 10 meters or more than a hundred meters from the locating circuit 90. Any location of the monitoring unit 80 with respect to the locating circuit 90 is considered within the scope of this disclosure, and the specific placement of the monitoring units 80 may vary depending on the size and type of the facility that they are located in. Locations may be indoors or outdoors, and each of the individual monitoring units 80 within the object location system may have different locations from one another, which may include different distances to each other, placement on different floors of a structure, and/or placement at different heights on the same floor of a structure. Different locations may generally include locations where a substantial distance is present between individual monitoring units 80, such as 5 meters, 10 meters, 25 meters, 50 meters or any other distance. It may be advantageous for the distance between individual monitoring units 80 to be as great as possible, thereby reducing the number of monitoring units 80 within the object location system, which may decrease an overall cost of the object location system. The monitoring units 80 may be positioned in substantially stationary positions, such as affixed to the wall, ceiling or floor of a structure and maybe located indoors or outdoors. However, semi-stationary positions may also be used, such as movable monitoring units 80 that can be kept stationary for a period of time while the object location system is in use.

As discussed previously, the number of monitoring units 80 may vary depending on the design of the object location system. However, the number of monitoring units 80 may also correspond to the desired result of the object location system, such as the desired level of accuracy of the object location system. For example, using only two monitoring units 80 may allow the object location system to calculate a one-dimensional location of the locating circuit 90 secured to the object, not unlike a proximity sensor, whereas using three monitoring units 80 may allow the system to calculate a two-dimensional location of the object. Using two or more monitoring units 80 positioned in at least one plane may allow the object location system to calculate a three-dimensional location of the locating circuit 90. The required number of monitoring units 80 relative to the dimensions sensed is based on the principle that determining a location of an object requires determining the location of one position relative to other defined reference positions. In other words, unambiguity of a determined or calculated location occurs in one-dimensional space with two reference points, in two-dimensional space with three reference points and in three-dimensional space with three or more reference points absent other constraints. Locating an object in four-dimensions may also be possible, as discussed with regards to tracking the location of an object over a period of time.

Furthermore, it is noted that it is possible to use monitoring units 80 in combination with constraints. For example, two monitoring units 80 may be used in combination with an algorithm that can be used to place restraints, constraints or limit positional possibilities. The algorithm restraints may be used, for example, to determine an upper ceiling or a bottom floor of the possibility of positions of the locating circuit 90. The algorithm may also include a sensing of a direction of movement, rate of movement, or rate of force applied to the locating circuit 90, among other sensed qualities. In this example, if two monitoring units 80 are used, the location of the locating circuit 90 may be calculated based on a distance from each of the two monitoring units 80, which can be used to map possible locations of the locating circuit 90 along intersecting spheres. The intersection of the spheres mapping the possible location of the locating circuit 90 may circular or elliptical in shape, and when the algorithm is applied to that circular or elliptical shape, the possible positions of the locating circuit 90 may be further narrowed. For instance, the locating circuit 90 would not be location along a portion of the mapped path that is above an upper ceiling or below a bottom floor.

To provide an example of using the algorithm with two monitoring units 80, or more than two monitoring units 80, it is possible to include a locating circuit 90 within a sporting item, such as a basketball. When the basketball moves in a game between players and teams within a basketball court, the monitoring units 80 may identify its location. An algorithm may be used to identify the floor of the court (bottom floor) and perhaps the ceiling of the court (upper ceiling). When the mapped circular or elliptical shape is positioned partially beyond the floor or the ceiling, the algorithm can exclude those portions from the possible locations of the basketball. Similarly, when it is detected that the basketball is moving between 0-5 feet off the floor of the court, an algorithm can be used to identify the movement as dribbling. The possibilities of identifying the position of the basketball are numerous, since the use of the algorithm in combination with the monitoring units 80 and other sensors, e.g., accelerometers, can effectively calculate a position of the basketball.

The ability to locate an object in two or three dimensions may have many utilities. In conventional systems using proximity sensors, a proximity sensor on one floor of a structure may detect the presence or proximity of a transmitter attached to an object on a different floor. For example, a proximity sensor positioned on a doorway on the fourth floor of a building, and controlling access through the doorway, may sense the proximity of an object on the third floor, and erroneously shut off access to the doorway on the fourth floor based on the sensed object on the third floor. This can cause inefficient and ineffective location monitoring, and may lead to many erroneous determinations, and ultimately, many security failures. Locating an object in three dimensions may prevent this erroneous determination, since the height of the object can be determined, and thus, an assessment of what floor the object is on can be made. Furthermore, locating an object in three dimensions may also allow the object location system to determine if an object having a locating circuit 90 has changed a height position, due to an external cause, such as falling down, being lifted up, etc. For example, this may allow the object location system to determine if an elderly patient has fallen, or if an infant has been lifted out of a crib, as well as many other scenarios.

The object location system may require the positions of the monitoring units 80 to be known positions, relative to the structure or facility that they're located in, and/or relative to one another. This may be achieved via any number of methods and devices, including determining the locations of the monitoring units 80, calculating the locations of the monitoring units 80 relative to one another, using a positioning device, such as Global Positioning System (GPS), or any other similar system. As discussed later, the positions of the monitoring units 80 may be known by other components of the object location system, including a location that is stored within the memory device 14, and may be used in calculating the position of the object.

The object location system uses an omnidirectional signal, or a plurality of omnidirectional signals that are intermittently communicated between the locating circuit 90 and the plurality of monitoring units 80. The omnidirectional signal may include any type of signal characteristic, and may be transmitted at Ultra Wide Band (UWB) and WiFi™ frequencies, as well as other frequencies of other communication mediums. Preferably, transmission occurs between frequencies of between 3.244 GHz and 6.99 GHz and/or greater than 6.99 GHz. A frequency of at least 3.244 GHz may overcome absorption of the omnidirectional signal by various obstacles, namely portions of the human body. One of the uses of the object location system is to determine the location of a human who has a locating circuit 90 affixed to their person with a wristband or similar device. The position of the locating circuit 90 proximate to the human's body may cause the body to absorb or delay some of or the entire omnidirectional signal depending on its frequency. Likewise, the location of a human body between the locating circuit 90 and one of the monitoring units 80 may absorb some or all of the omnidirectional signal. Absorption of the omnidirectional signal may interfere with the timing of transmission of the omnidirectional signal, which in turn, may affect the accuracy of the object location system. Other obstacles may also absorb the omnidirectional signal, including building structures like walls and floors, large pieces of equipment, and other structures.

It has been determined through experimentation and testing that an omnidirectional signal transmitted at a frequency of at least 3.244 GHz may overcome a substantial portion of any absorption of the omnidirectional signal. Thus, transmitting the omnidirectional signal at a frequency of at least 3.244 GHz may allow the object location system to function successfully. Furthermore, it has also been determined that transmitting the omnidirectional signal at a frequency of at least 3.244 GHz, or between 3.244 GHz and 6.99 GHz may overcome substantially all absorption of the omnidirectional signal by a human body, or other obstacles. Accordingly, the object location system may emit the omnidirectional signal above 3.244 GHz, but preferably above 3.244 GHz, and more preferably between 3.244 GHz and 6.99 GHz. Transmission at or above 6.99 GHz may overcome substantially 100% of any biological signal absorption. Transmission of the omnidirectional signal at approximately 6.99 GHz may allow the object location system to determine the location of the locating circuit 90 secured to the object without interference from biological signal absorption. It is noted that other emission frequencies may also be used, including more precise frequency ranges or frequencies above 6.99 GHz, as may depend on the design and use of the object location system. Any frequency emission is considered within the scope of the present disclosure.

The omnidirectional signal may be communicated between the locating circuit 90 and the plurality of monitoring units 80 in a variety of ways, including via one-way communications, two-way communications, three-way communications with another component of the object location system, or any other type of communication. For example, the omnidirectional signal may commonly be communicated or transmitted from the locating circuit 90 to the plurality of monitoring units 80. In one of many alternatives, the plurality of monitoring units 80 may each transmit the omnidirectional signal to the locating circuit 90. As can be seen, the omnidirectional signal may be transmitted from and received by either or both of the locating circuit 90 and the monitoring units 80. The locating circuit 90 and/or the plurality of monitoring units 80 may each include any number or type of receiver, transmitter and/or transceiver.

The object location system may include many locating circuits 90 each transmitting many omnidirectional signals to a plurality of monitoring units 80. For example, a plurality of locating circuits 90 may be used in a structure where many objects are desired to be located at the same or similar times. Each of the locating circuits 90 may be secured to an object, and each may transmit an omnidirectional signal to any number of monitoring units 80. The plurality of monitoring units 80 may each transmit the omnidirectional signal to the plurality of locating circuit 90, as the case may be. Any number of locating circuits 90 and objects 12 may be located within the object location system, including 10, 50, hundreds or thousands of locating circuits 90, which may be located simultaneously or at intervals, all of which are considered within the scope of the present disclosure.

A calculator 60 is in communication with the processor 12, wherein calculator 60 directs the processor 12 to determine a duration of transmission time of the omnidirectional signal communicated from the locating circuit 90 to the at least one monitoring unit 80 and directs the processor 12 to calculate a location of the locating circuit 90 using the determined duration of transmission time of the omnidirectional signal. The calculator 60 may include any number of computerized devices, having any type of processors and a variety of computerized programs capable of performing calculations, including a general control unit for initiating the processor (described further with respect to FIG. 3). Generally, the calculator 60 may include, or may be implemented as a software application, or computer program for carrying out instructions on a computer processor to calculate a location of the locating circuit 90.

The calculator 60 may determine a duration of transmission time of the omnidirectional signal for each signal communication in a variety of ways, all of which may be capable of determining the duration of the transmission time of the omnidirectional signal between a start transmission time and an end transmission time, and between the components that the omnidirectional signal is being communicated between. For example, the calculator 60 may determine the duration of the transmission time for each omnidirectional signal that is transmitted from the locating circuit 90 to each of the plurality of monitoring units 80, respectively. Thus, if an object location system includes six monitoring units 80 and one locating circuit 90, then the calculator 60 may determine six transmission time durations.

It is noted that the calculator 60 may determine any number of transmission time durations between any number of monitoring units 80 and locating circuits, which includes determining only the transmission time durations of a portion of the total transmitted omnidirectional signals. For example, if a object location system has one hundred (100) monitoring units 80, each receiving an omnidirectional signal from only one locating circuit 90, the calculator 60 may determine some, all or any portion of the total number of transmitted omnidirectional signals. Similarly, the calculator 60 may be capable of determining the transmission durations of a plurality of omnidirectional signals that are transmitted between a plurality of locating circuits 90 and a plurality of monitoring units 80, respectively. The number of determinations that the calculator 60 makes may depend on the number of transmission durations required for calculating a location. Although two or more monitoring units 80, and thus two or more transmission durations, are needed for determining a location in three-dimensional space, additional transmission durations may be used to verify a calculated location.

The calculator 60 may determine the transmission durations in a number of ways. For example, the locating circuits 90 may each include embedded firmware that calculates time on board, which may be used by the calculator 60 to calculate and triangulate a three-dimensional location based on the synchronized timing of the omnidirectional signals received. The firmware within the locating circuits 90 may include data indicative of a time-stamp, such as a start time time-stamp of the transmission. When the omnidirectional signal is received at a monitoring unit 80, the monitoring unit 80 may place a second time-stamp on the omnidirectional signal, indicative of a received time. Accordingly, a duration of transmission time may be calculated based on the time-stamps.

The calculator 60 determines the transmission durations in other ways too. For example, the calculator 60 may include software that is capable of facilitating two-way ranging between the locating circuits 90 and the monitoring units 80, and/or real-time locating. Two-way ranging may include independently ranging two or more fixed monitoring units 80 with known locations to at least one locating circuit 90. The calculator 60 may then calculate three distances, which define three circles to a point of intersection, which may be determined to be the location of the locating circuit 90. Other ways may include using a Time Difference of Arrival (TDOA) scheme utilizing a clock that is synchronized between each of the monitoring units 80. In this design, each of the locating circuits 90 may transmit the omnidirectional signal at predetermined intervals. Each of the monitoring units 80 may receive the transmitted omnidirectional signal and timestamp them. To ensure accuracy within the object location system, clock synchronization must be completed, whereby the timestamps of each of the omnidirectional signals received must be synchronized. The calculator 60 eventually calculates the position of the locating circuit 90 based on the time-stamped omnidirectional signals.

Another way to determine the duration of transmission time is by determining the precise duration of the transmission time for each of the omnidirectional signals. For example, if the omnidirectional signal is received at three monitoring units 80, the calculator 60 may determine three durations of time, i.e., durations represented by variables a, b and c. As discussed above, this may be accomplished by programming the locating circuit 90 to transmit the omnidirectional signal at a precise time, coordinating that precise time with the calculator 60, and then determining the duration of time between when the omnidirectional signal was transmitted and when it is received at each of the monitoring units 80. Alternatively, the omnidirectional signal may carry data indicative of a start transmission time. The calculator 60 may then determine a received or end transmission time at the monitoring unit 80 and compare the start and end times with each other. It is noted that the determined durations of transmission time may, in some instances, be the same duration. This may indicate that the locating circuit 90 is located exactly halfway between two monitoring units 80.

In one of many alternatives, the calculator 60 may determine a difference in the duration of transmission time of the omnidirectional signal relative to one monitoring unit 80 of the plurality of monitoring units 80 and the duration of transmission time of the omnidirectional signal relative to another monitoring unit 80 of the plurality of monitoring units 80. For example, the calculator 60 may determine a first transmission duration, or a time of receiving the omnidirectional signal at one monitoring unit 80, and then compare that time with the times that other monitoring units 80 receive the omnidirectional signal. In this case, the durations of transmission may be given in relative variables, i.e., $n_1$, $n_2$, $n_3$, etc., or $\alpha+n_1$, $\alpha+n_2$, $\alpha+n_3$, etc., where variable a is the one determined transmission duration and each subscript n stands for the difference in time between receiving a at one monitoring unit 80 and each of the additional monitoring units 80.

It is contemplated that the object location system may include a large number of objects, each having a locating circuit 90 secured thereto, and each located at substantially the same time. When determining the location of each of the objects, the calculator 60 may need to make a significant number of measurements and/or determinations in a short period of time. For example, in many large hospitals, hundreds if not thousands of patients, medical and facility personnel, including doctors, nurses, technicians, secretaries, janitors, etc., may be located with the object location system. If only 100 of these people are desired to be located in one second, each using only one locating circuit 90 and three monitoring units 80, three hundred calculations may need to be made in that one second. However, with larger facilities, tens or hundreds of monitoring units 80 may be used, which may compound the number of measurements that must be made. To limit the number of measurements, to limit computation or measurement time, the calculator 60 may be programmed, instructed or choose to only determine the transmission duration of the omnidirectional signals received at a specific monitoring unit 80. In other words, only a few of an available total monitoring units 80 may be required to determine the transmission duration of an omnidirectional signal. This may be specified by a distance from the monitoring unit 80 to the locating circuit 90, a carrying load of the monitoring unit 80, the number of locating circuits 90 in a given area, or other factors.

The calculator 60 is in communication with each of the plurality of monitoring units 80 and calculates a location of the locating circuit 90 using the determined duration of transmission time for each of the plurality of monitoring units 80 and the locating circuit 90. Communication to and from the calculator 60 may include any communication system and the calculator 60 may include or be embedded with any device capable of performing one or more calculations. This may include a computerized device having a processor that runs a quantity of computer-readable code, where the code may have instructions for performing the calculations, such as a personal computer (PC) or a server. The calculations that the calculator 60 makes may be substantially based off of the determined transmission durations for the omnidirectional signal. The calculator 60 may compare the different transmission durations, and determine a location of the locating circuit 90 that the omnidirectional signal was transmitted from. As discussed previously, the location of the locating circuit 90 may be expressed in a variety of ways, including in one, two or three dimensions to an accuracy at or beyond at least 0.1 meters of a true location of the locating circuit 90.

The calculator 60 may calculate the location of the locating circuit using one or more timing algorithms. A timing algorithm may be variable-based expression that provides a numerical representation of a location based off of inputs the determined transmission durations from each of the plurality of monitoring unit 80 and known mathematical concepts. This essentially eliminates the need for conventional methods and systems for determining a location, including pinging, RFID based systems, ultrasonic systems or radar systems, that rely on the timing of a returned transmission signal. The object location system ultimately determines the location of the object with the determined transmission durations, or a comparison thereof. Accordingly, determining the transmission durations to a precise degree is necessary for accuracy within the object location system. The timing algorithms may allow the object location system to determine the location of the object to a high degree of accuracy, such as within 10 cm in a three-dimensional space. However, the object location system is capable of accuracy to any degree, including those less than or greater than 10 cm in a three-dimensional space.

Furthermore, it is contemplated that the rate of transmission may be varied depending on the use of the system 10, and therefore, it may be possible to increase the rate of transmission to substantially identify a length of time that a locating circuit 90 is located in a particular area. For example, the system 10 may be able to monitor how long a monitoring circuit 90 is located proximate to a sink to determine the length of time a user of the system spent at the sink, thereby estimating the length of time that was spent washing their hands, for example, Accordingly, the system 10 may determine when the locating circuit 90 enters a predefined zone, such as a radial zone about a sink. When the locating circuit 90 is detected within this zone, the rate of transmission may increase to effectively detect when the locating circuit 90 exits this zone. For example, the rate of transmission may increase from one transmission/minute to one transmission/second. The time of detection of the locating circuit 90 within the zone, or in a particular area of the zone, may be used to identify or estimate an action of the user carrying the locating circuit 90, e.g., the action of washing his or her hands for a sufficient period of time. A historical record may be kept of all transmissions and locations. Beyond the examples given herein, the ability to increase or decrease transmission frequency based on the detection of the locating circuit 90 within a particular zone may have many uses and benefits.

It is also contemplated that the system 10 can be used to monitor for scheduled events, specifically, to monitor for the expiration of medical equipment. The locating circuit 90 may be applied to a unit of medical equipment, thereby allowing the system 10 to monitor when the medical equipment is moved. Data about the medical equipment, including a model number, an expiration date, and/or a scheduled inspection date, etc. may be correlated within the system 10 to match the specific unit of medical equipment. If the system 10 detects via the locating circuit 90 that a unit of medical equipment that is expired or requires an inspection is in transit or is located in a patient's room, the system 10 may send an alert to inform the user that the medical equipment should not be used. Thus, the system 10 may be capable of preventing the inadvertent use of medical equipment that may be expired or uninspected.

It is noted that any of the abovementioned features may be carried out on any number of calculators 60 that are embedded with various components of the object location system. For example, the portion of the calculator 60 that determines transmission durations may be distinct or separate from the portion of the calculator 60 that determines a location based on the transmission durations. Similarly, other processes and steps within the object location system may be carried out by the plurality of monitoring units 80, the locating circuit 90, and/or the calculator 60, or any combination thereof. Any of these components may include any number of computerized processors, storage databases or software, as may be dependent on the design of the object location system. Accordingly, any variations to the object location system as described herein are considered within the scope of the present disclosure.

Figure 2:
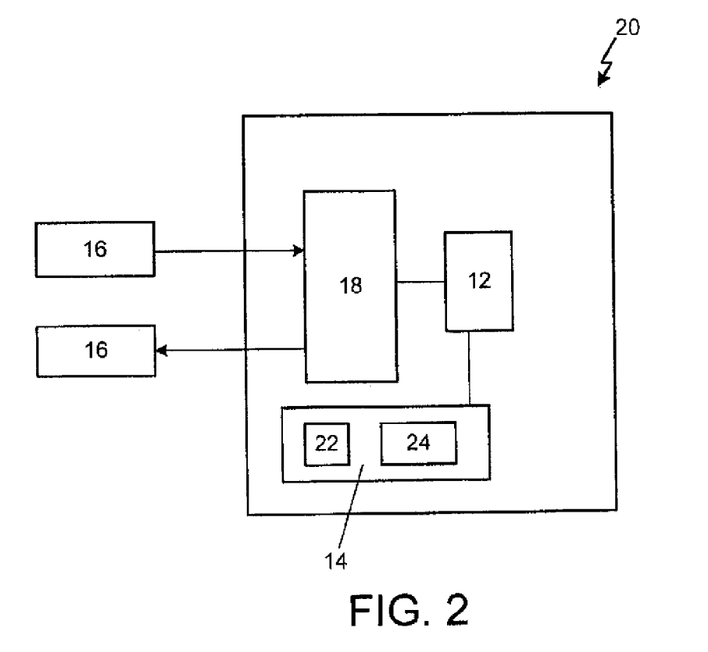
FIG. 2 is a schematic illustration of a general-purpose computer for use with the computerized device, in accordance with a first exemplary embodiment of the present disclosure.

FIG. 2 is a schematic illustration of a general-purpose computer 20 for use with the computerized device 10, in accordance with a first exemplary embodiment of the present disclosure. The general-purpose computer 20, which may be referred to simply as 'computer 20' herein, may include any of the components of the computer 20, in whole or part, as described with respect to FIG. 2, but may also include a variety of additional components. Accordingly, the computer 20 of FIG. 2 is to provide clarity in describing the general functioning of a computing system and is not considered limiting to the computerized device 10.

The computerized device 10 may include a variety of computer-based components, in whole and in part. For example, the computerized device 10 may be implemented in software (e.g., firmware), hardware, or a combination thereof. In the first exemplary embodiment, the computerized device 10, is implemented in software, as an executable program having quantities of programmable code that are processor-executable. The software or programmable code may be executed by any special or general purpose digital computer, such as a personal computer (PC; IBM-compatible, Apple-compatible, or otherwise), workstation, minicomputer, smart phone, tablet computer, or mainframe computer.

In terms of hardware architecture, as shown in FIG. 2, the computer 20 includes a processor 12, memory device 14, which may include on or more executable files stored within the memory device 14, and one or more input and/or output (I/O) devices 16 (or peripherals) that are communicatively coupled via a local interface 18 (I/O interface). The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the memory device 14. The processor 12 can be any custom made or commercially available processor, a central processing unit (CPU), an auxiliary processor among several processors associated with the computer 20, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, a 68xxx series microprocessor from Motorola Corporation, a Phenom II X4 975 BE from AMD, or a Pentium E5800 and/or Core 17-990X from Intel Corporation.

The memory device 14, which may often be referred to as 'memory,' can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device 14 may incorporate electronic, magnetic, optical, and/or other types of storage media. Note that the memory device 14 can have a distributed architecture, where various components are situated remote from one another, but can be accessed by the processor 12. For example, the memory device 14 may have a partitioned drive for storage of data in separate and distinct areas with communication therebetween through the processor 12.

The software in the memory device 14 may include one or more separate programs and/or executable files, each of which comprises an ordered listing of executable instructions for implementing logical functions. In the example of FIG. 2, the software in the memory device 14 may include an operating system (O/S) 22, which manages computer hardware resources and provides common services for execution of various software applications 24. A nonexhaustive list of examples of suitable commercially available operating systems 22 includes Windows or mobile operating system available from Microsoft Corporation, a Netware operating system available from Novell, Inc., a Macintosh operating system available from Apple Computer, Inc., a UNIX operating system, which is available for purchase from many vendors, such as the Hewlett-Packard Company, Sun Microsystems, Inc., and AT&T Corporation, a LINUX operating system, which is freeware that is readily available on the Internet, a run time Vxworks operating system from WindRiver Systems, Inc., and an appliance-based operating system, such as that implemented in handheld computers or personal data assistants (PDAs) (e.g., PalmOS available from Palm Computing, Inc., and Windows CE available from Microsoft Corporation), tablet computers, smart phones and other mobile computing devices.

The operating system 22 may control the execution of other computer programs, namely software applications 24, and provides scheduling, input-output control, file and data management, memory management, and communication control and related services. The software applications 24 may include any type of computer program or software that is installed, downloaded, or otherwise stored, at least in part, in the memory device 14. Software applications 24 may include activity or function-specific programs and general functioning programs. For example, a nonexhaustive list of software applications 24 includes programs for word processing (i.e., MS Office Suite available from the Microsoft Corporation), data-processing, image processing (i.e., Creative Suite or Adobe Reader available from Adobe Systems, Inc.), gaming, anti-virus, and communication (i.e., AOL Instant Messenger available from America On-Line), or any other software program. Additionally, it is noted that software applications 24 are commonly referred to as 'Apps.'

The software application 24 on the computer 20 may include a source program, executable program (object code), script, or any other entity comprising a set of instructions to be performed. When a source program, then the program needs to be translated via a compiler, assembler, interpreter, or the like, which may or may not be included within the memory 14, so as to operate properly in connection with the O/S 22. Furthermore, the software application 24 may be written as an object oriented programming language, which has classes of data and methods, or a procedure programming language, which has routines, subroutines, and/or functions, for example but not limited to, C, C++, Pascal, Basic, Fortran, Cobol, Perl, Java, and Ada.

The I/O devices 16 may include input devices, for example but not limited to, a keyboard, mouse, scanner, microphone, communication connection, or other computerized device, etc. Furthermore, the I/O devices 16 may also include output devices, for example but not limited to, a printer, display, etc. The I/O devices 16 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 20 is a PC, workstation, or the like, the software in the memory device 14 may further include a basic input output system (BIOS) (omitted for simplicity). The BIOS is a set of essential software routines that initialize and test hardware at startup, start the O/S 22, and support the transfer of data among the hardware devices. The BIOS is stored in ROM so that the BIOS can be executed when the computer 20 is activated. When the computer 20 is in operation, the processor 12 is configured to execute software stored within the memory device 14, to communicate data to and from the memory device 14, and to generally control operations of the computer 20 pursuant to the software. The I/S 22, in whole or in part, but typically the latter, are read by the processor 12, perhaps buffered within the processor 12, and then executed.

The computer 20 can include software applications 24 which can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The computer 20 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Alternatively, functioning of the computer 20 may be implemented in hardware, which may require any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
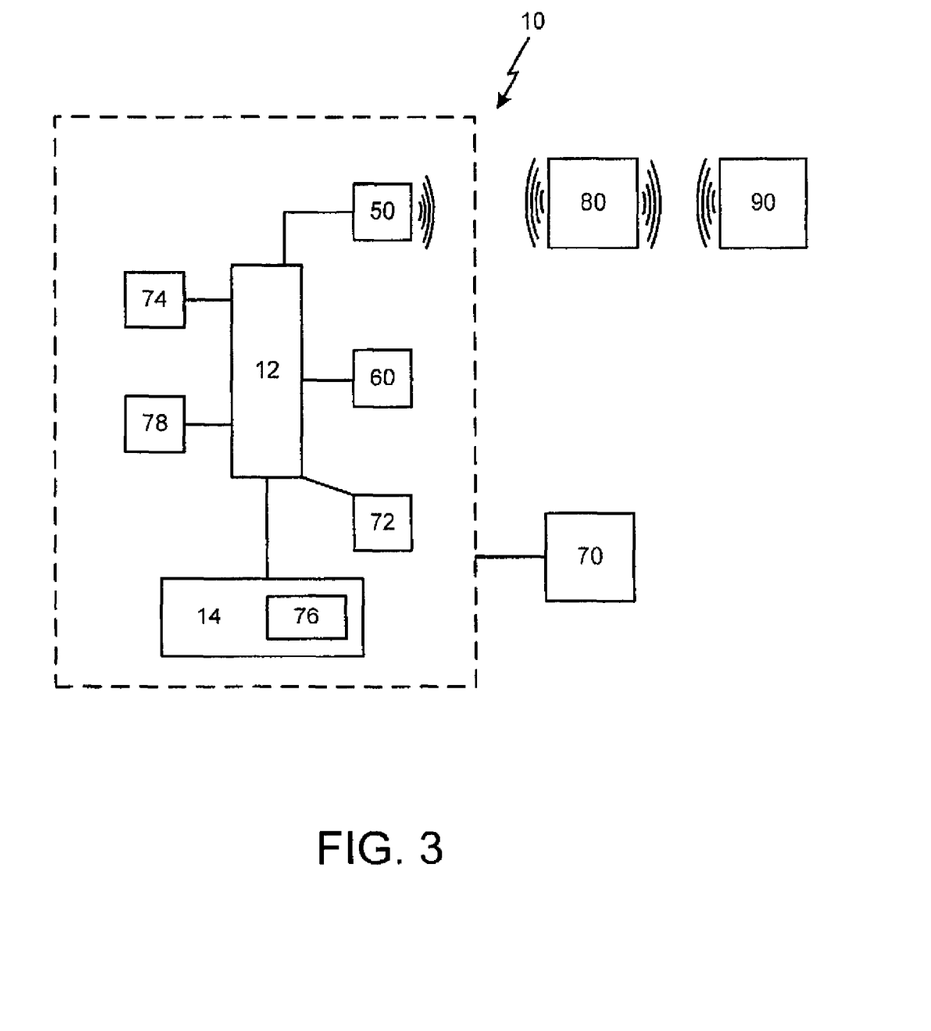
FIG. 3 is a schematic illustration of a computerized device for use with an object location system, in accordance with the first exemplary embodiment of the present disclosure.

FIG. 3 is a schematic illustration of a computerized device 10 for use with an object location system, in accordance with the first exemplary embodiment of the present disclosure. In addition to the components discussed above with respect to FIGS. 1-2, the computerized device 10 may include many other components for performing additional functions. For example, the computerized device 10 may include a graphical user interface (GUI) 70 that is capable of graphically displaying images, text, or other displayable material on a display screen. The GUI 70 may include any type of display, including an electronic display screen such as an LCD or plasma display screen, or a display screen on an external device, such as a PDA or smart phone. The GUI may be in communication with various components of the computerized device 10, including the processor 12.

The GUI 70 may be capable of displaying various items as needed, and as directed by the processor 12. For example, the GUI 70 may display an image of a navigatable structure, such as a hospital or building. This may include the various characteristics of a building, such as hallways, stairs, rooms, floors, etc. Additionally, the GUI may display the calculated location of the locating circuit 90 on the image of the navigatable structure, such that a user can easily determine where the locating circuit 90 is located based on relative reference points on the image of the navigatable structure. This may also include displaying multiple positions of the same locating circuit 90 such that the location of the locating circuit 90 can be tracked over a period of time. This 'bread crumbing' technique may allow a user of the computerized device 10 to see the positions of a locating circuit 90, or predict future movements of the locating circuit 90 based on past movements.

The computerized device 10 may include a plurality of GUIs 70 positioned in various places and displaying different information. For example, each room within a hospital may include a television, which can act as a GUI 70 for the computerized device 10. A newborn baby within the patient room may have a locating circuit 90 that is matched or not matched with other locating circuits 90. When one of these other locating circuits 90 enters the room, the GUI 70 may display whether a match or non-match exists, as well as any other information, such as the name, photo, a logo, or an ID of the person associated with the entering locating circuit 90. The GUI 70 may display these items for a period of time, and may also indicate that an alarm has been triggered.

The computerized device 10 may also include a control unit 72. The control unit 72 may be characterized as a device, which gives instructions to the processor 12 and directs the processor 12 to execute at least a portion of the quantity of programmable code within the computerized device 10. The programmable code may be within the memory device 14, within an application program, or within any other part of the computerized device 10. Additionally, the programmable code may be communicated to the computerized device 10. For example, when a user manually directs the computerized device 10 to locate a particular locating unit 90, the user may use the mouse (or other input device), to instruct a program to perform the locating steps. The control unit 72 may relate the user's instructions to the processor 12 such that the task can be performed. It is noted, however, that the control unit 72 may be included within the processor 12 or any other components of the computerized device 10. For example, the control unit 72 may be located within each application program on the computerized device 10, or within the processor 12. Accordingly, the control unit 72 may relate instructions from a component, user, or program, to the processor 12, such that a task can be completed.

For example, the control unit 72 may be used to direct the processor 12 to monitor the life of a battery that is within a locating circuit 90. The battery or batteries within the locating circuit 90, as discussed above, may have a predetermined lifespan. It is desired to replace the battery prior to the end of its lifespan, to ensure that the object locating system functions as desired. A software application, or other program, may be installed in the memory device 14 to provide the instructions necessary for the computerized device 10 to determine the lifespan of a battery in the locating circuit 90. Accordingly, when it is necessary to do this, which may be constantly, automatically, at predetermined intervals, or based on a manual command, the control unit 72 may instruct the processor 12 to run the necessary program code. It is noted that the batter lifespan may be communicated to a user, or another component of the computerized device 10, when it reaches a specific level, such as 30%, 10%, etc.

The computerized device 10 may also include an alarm system 74. The alarm system 74 may generally be characterized as any system that is capable of initiating or controlling an alarm. For example, when the location of a locating circuit 90 is determined to be in a predetermined area, such as close to an exit door, close to an elevator, proximate to a non-matching locating circuit 90, or any other location which warrants an alarm, the control unit 72 may instruct the processor 12 to initiate the alarm system 74 to notify someone of the location of the locating unit 90. The alarm may include any type of alarm, including an audible, visual, or textual alarm, or an electronic message, or simply a log of the alarm within the memory device 14. For example, if the locating circuit 90 associated with a newborn baby is determined to be at an exit door, control unit 72 may direct the processor 12 to initiate the alarm system 74 to display warning lights at the exit door, or an audible alarm in the surrounding area.

The alarm system 74 may receive alarms or alerts from other devices within the object locating system. For example, the alarm system 74 may receive alerts or messages from wireless exit nodes that are placed along exits within a building. The alarm system 74 may receive these messages and determine what action to take, if any. A node within the object location system may send a message to the alarm system 74 that indicates that a person with a locating unit 90 has exited the door or is within a predetermined distance from the door. The alarm system 74 may receive the message and communicate with other components of the computerized device 10 to determine which action to take, i.e., to authenticate the user, etc. In the above example, if the person nearing the door has access to proceed through the door, then the alarm system 74 may not signal for an alarm to be sounded, but if the person is restricted from proceeding through the door, then the alarm system 74 may communicate to a speaker, light array or other alarm device to provide an alarm.

The memory device 14 may include various partitions or sectors that house specific information. For example, the memory device 14 may include a log memory 76 area that stores the logged activity of a locating circuit 90. Again, the control unit 72 may direct the processor 12 to record various activity of the locating circuit 90, including a position or movement of the locating circuit 90. The log memory 76 may be configured based on each locating circuit 90, or based on function, or any other configuration. For example, all of the activity of a particular locating circuit 90 may be logged in a folder within the log memory 76, or all movement activity of all locating circuits 90 may be logged in a 'movement' folder. The log memory 76 may record any event or activity or the locating circuit 90, the monitoring unit 80, or any other component of the computerized device 10 or object locating system, in whole or in part. Additionally, the log memory 76 may include a log of an associating a time stamp of a manufacturing date, a shipping date, an activation date, and/or an expiration date of the locating circuit 90. The log memory 76 may be accessible or restricted to accessing, viewing, and/or manipulation.

The computerized device 10 may include a selection element 78 that is in communication with the processor 12. The selection element 78 may be characterized as any software application or device that allows for sorting, displaying, or otherwise configuring a portion or all of the locating circuits 90 in a desired manner. In other words, the selection element 78 may allow a user of the computerized device 10 to view only a specific portion of the locating circuits 90 in use based on some associated identifying characteristic of the locating circuits 90. For example, each locating circuit 90 within the object locating system may be associated with many identifying characteristics, including the name or information of the object or person that the locating circuit 90 is attached to. Other associated identifying characteristics may include a person's medical care, age, doctor, status, etc. Some or all of this information, appropriately corresponding to a locating circuit 90, may be stored within a database or the memory device 14 (or any sub-memory device), and may later be retrieved for viewing. The selection element 78 may allow a user to see only the desired parts of this information, thereby providing clarity in the information presented.

For example, the selection element 78 may be a software application accesses all patient data appropriately corresponding to a locating circuit 90. The selection element 78 may have various drop-down menus that allow a doctor to sort the patients based on their characteristics. A doctor that wishes to see all of her patients, for example, may simply select a 'doctor' selection on the menu. The selection element 78 may then display only the patients that as assigned to that doctor. This principle can be applied to virtually any characteristic of an object or person. For example, the selection element 78 may allow a user to see the location of all elderly patients, all infants, all on-duty medical personnel, a particular box of medicine, all wheelchairs, etc. The examples provided herein are not limiting to the multitude of uses the selection element 78 offers, all of which are considered within the scope of the present disclosure.

Additional components, features, and functions of the computerized device 10 are described herein with respect to FIGS. 1-3. The communication element 50 of computerized device 10 may enable any type of communication, as discussed above. This may include full two-way communication supported by a software application. To begin use of the computerized device 10, each user of the computerized device 10 may be issued a card, herein after referred to as a 'smart cart,' or may use an existing ID card or badge to easily incorporate their information into the computerized device 10. For example, a smart card may be given to all users and their information will be entered into the software application under a 'Staff Permissions' window. Since many current hospital and medical field employees are required to carry ID badges with their information, the computerized device 10 may allow for easy incorporation of the existing ID as a smart card. Of course, other ways of inputting information into the system are also available.

Once a smart card (or existing ID) is assigned to a user, the software application may assign a specific permission level to that smart card. Any number of permission levels may exist, depending on the design and use of the computerized device 10. For example, the software application may include default permission levels and a custom option:

'SCP Root'—Exclusive to technicians who will have complete access to the system, will be able to modify features, enable system upgrades to hardware and software remotely. May access 'Technician Menu' and all of its settings.

'Root'—Distributor level, will be allowed to save hardware data (such as range) to upload into replacement equipment, configure the transmitter "noiselist", as well as modify the hardware settings such as range from the GUI. This user level has permission to the 'Technician Menu' and all of its settings.

'Master'—Will be able to change operational modes of hardware (such as PM mode, Loiter time) from the GUI, also able to create and modify staff permissions in the software for all levels except 'SCP Root' and 'Root.'

'Admin'—advanced access to the software. Add/remove transmitters, modify transmitter list, clear alarms for exits, and clear-cut band alarms at the GUI.

'User'—basic access to software. Able to admit/discharge, access/view transmitter list, access device status, create reports, modify GUI interface options (font size, colors, alarm volume), setup and clear 'Scheduled Absences,' review current events, utilize transfer if floor to floor is enabled and turn device zones on and off. Will only be able to clear alarms at the exit and not be able to clear cut band alarms.

'Guest'—no access to the software, only eligible to unlock a door in PM mode provided no transmitters are within range.

'None'—only be able to Login to the software provided a proper user and password.

'Custom'—In addition to these default levels the 'Master level' can customize any other level (except for 'SCP Root' and 'Root') to allow for any additional permissions (except those exclusive to 'SCP Root' and 'Root') to be added or removed from any individual user. Users with the customized options will be categorized as 'Custom' users with a notation as to the default level that they are initially built from.

The application software of the computerized device 10 may be responsible for managing all 'smart cards' or electronic credentials (smart cards, proximity cards, biometric devices, near-field communication device, and magnetic strips) to tie to permission levels described above. When a new staff permission is added to the system (or an existing staff permission removed), a mass programming event to all exits and nodes will take place, effectively programming all exits and nodes each time the staff permissions section of a database is changed or updated. A feedback loop will be put in place to confirm which exits and nodes got the staff permission updates and which did not. This feedback is on an individual device level, meaning that each individual device will report back whether it got the change or didn't. It is preferable for the software application to be running 100% of the time if the system is configured with it. If the system does not include the software it is only expected to be used by distributors and technicians at installation and for upgrading and troubleshooting. The computerized device 10 may also enable end device configurations to be saved to a database under device settings to enable rapid replacement of failed hardware. Settings such as functional modes, range, etc. are to be able to uploaded to hardware as necessary for replacement and multiple identical installs. The software should be able to set up a configuration for the hardware and then apply it to as many units as necessary in an easy to use format.

The computerized device 10 is intended to be used to replace existing systems used with object locating systems. Accordingly, the computerized device 10 may replace or modify certain features of existing systems, while leaving others intact. For example, some systems that may need to be modified may include the rapid addition of locating circuits 90 to the 'locating circuit list' by way of a new tool to enter a block of locating circuit 90 IDs at once. A 'technician menu' toggle may be used to add a "noiselist" option to the locating circuit list. Locating circuit 90 IDs in this list may be purposefully ignored in the software in relation to annunciating alarms and alerts and the software will tell exits and cut-band nodes to ignore any signals from these IDs. Locating circuit 90 IDs entered into this "noiselist" cannot have patients admitted to them. This feature will eliminate persistent false cut-bands from locking down exits.

A 'floor to floor' mode may allow the use a shared door between wards of a hospital. The computerized device 10 may be able to take one common door that separates two wards on a floor and utilize it on both floor maps. Alarms or alerts generated at that exit should appropriately announce for which ward the alert or alarm is coming from. A shared door should annunciate properly for however many floor maps it is required to populate. A 'scheduled absence' window may be included to enable scheduling multiple events for one (1) locating circuit 90 on a recurring basis, i.e., using Microsoft Outlook meeting scheduler as an example. This may allow the ability to extend the length of a scheduled absence without having to delete it and create a new one.

When the computerized device 10 is used, the hardware will update the software database with its warranty/commission date for exact tracking for returns and replacements. There may need to be a new field in the device status report that includes this information. As noted previously, a software application may implement an RTLS algorithm to enable "bread crumbing" or real time GUI tracking of transmitters on a system map that will allow for accurate calculation from an X, Y and Z axis for RTL systems. The software will require accurately scaled maps of indoor floor plans and outdoor perimeter layout to be provided by facilities. The RTLS portion of a software application should be written such that it allows for upgradeable scalability in system design, it will tolerate high volumes of locating circuits 90, such as 4,000 locating circuits 90 on multiple floors, communicating to the computerized device 10.

Any map or image of a structure may have a reference point that enables scaled maps to be placed on screen that will allow for accurate calculation from an X and Y axis for non-RTL systems basis for general location of a transmitter using UWB technology. The computerized device 10 may be able to calculate where a transmitter is within a cut-band device zone given a properly scaled floor map and outdoor perimeter layout. The GUI appearance may be modified to move the map and feature panels below the status grid. The feature panels are desired to be hidden unless hovered over with a mouse icon, such that they remain out of sight until desired to be used. When the feature panels are hidden the floor map will automatically fill that portion of the screen seamlessly.

The object locating system may include locating circuits 90 with the ability to detect a fall of the object using an accelerometer, or detect when a band holding the locating circuit 90 to the object is cut, as is described in related applications. Accordingly, in the event of a fall detection or a cut-band alanu, the GUI will exclusively highlight the device icon location and information. In the event of multiple instances occurring at once, all should be displayed. The software may have a 'root level' technician menu toggle for enabling/disabling a 'Panic Alert' button on adult transmitters if the facility chooses to purchase that option. The software application may also have the ability to sort the GUI status grid events by either ascending or descending order based on the age of the events. This will be a toggle option in the 'technician menu' and will make it so that the default option is either to display the oldest events at the top of the GUI grid at all times or have the latest events at the top of the GUI grid at all times. Facilities will be able to set their own preference for how they want this feature to be set.

The software application may communicate with any existing peripheral software used within the industry, such as Global STAT, Archiver, Sentry, and Safeguard. Modifications to these existing applications may be required to enable interaction with a RTLS and WiFi system. The software application may have a method for external server backups and upgrading via a communication link. This may allow for off site database management at a server farm or other facility. The software application may enable the receipt of a matching event between a patient's locating circuit 90 and any wearable mothers/parent locating circuit 90 and any wearable staff locating circuit 90. It will also enable the receipt of a matching event between a patient's locating circuit 90 and any permanently mounted mothers/parent indoor node. In either scenario (wearable or permanent mounted hardware) the software will annunciate any match or mismatch as an alert or alarm on the GUI. Matches or mismatches can be set to alerts or alarms depending on the facility's preference. The software may be able to globally control volume on all end devices. The software application may also be able to setup perimeter zones where specific locating circuit 90 IDs can get through doors and other cannot. The software will be able to communicate with the hardware to allow certain ID values the privilege of passing through specific perimeter zones.

Figure 4:
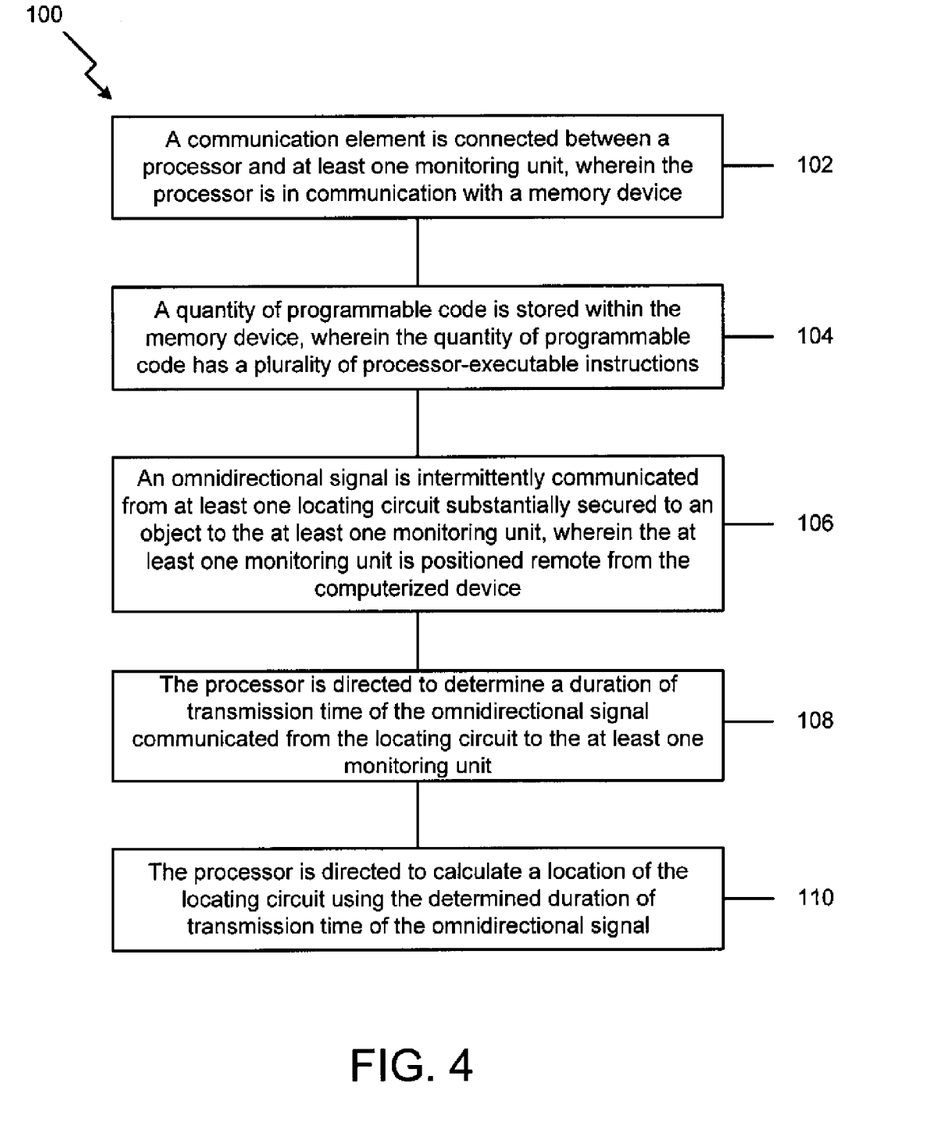
FIG. 4 is a flowchart illustrating a method of controlling an object location system with a computerized device in accordance with the first exemplary embodiment of the disclosure.

FIG. 4 is a flowchart 100 illustrating a method of controlling an object location system with a computerized device 10 in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102 a communication element is connected between a processor 12 and at least one monitoring unit 80, wherein the processor 12 is in communication with a memory device 14. A quantity of programmable code is stored within a database, wherein the quantity of programmable code has a plurality of processor-executable instructions (Block 104). An omnidirectional signal is intermittently communicated from at least one locating circuit 90 substantially secured to an object to the at least one monitoring unit 80, wherein the at least one monitoring unit 80 is positioned remote from the computerized device 10 (Block 106). The processor 12 is directed to determine a duration of transmission time of the omnidirectional signal communicated from the locating circuit 90 to the at least one monitoring unit 80 (Block 108). The processor 12 is directed to calculate a location of the locating circuit 90 using the determined duration of transmission time of the omnidirectional signal (Block 110). In addition to the steps explicitly disclosed with respect to FIG. 4, the method of controlling an object location system with a computerized device 10 may include any of the features, processes, functions, or actions disclosed with respect to FIGS. 1-3.

Figure 5:
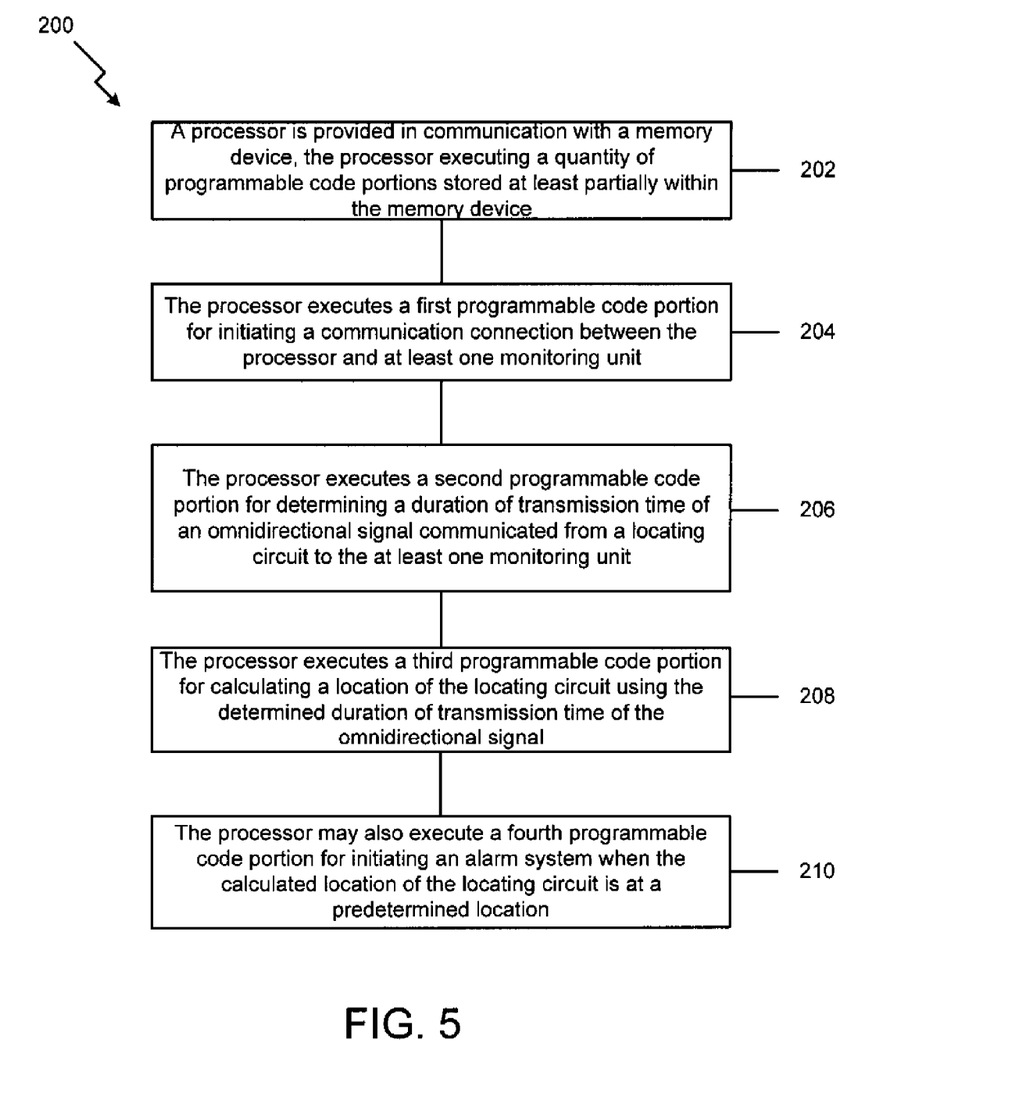
FIG. 5 is a flowchart illustrating a method using a programmable system for locating an object in accordance with a second exemplary embodiment of the disclosure.

FIG. 5 is a flowchart 200 illustrating a method using a programmable system for locating an object in accordance with a second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202 a processor is provided in communication with a memory device, the processor executing a quantity of programmable code portions stored at least partially within the memory device. The processor executes a first programmable code portion for initiating a communication connection between the processor and at least one monitoring unit (Block 204). The processor executes a second programmable code portion for determining a duration of transmission time of an omnidirectional signal communicated from a locating circuit to the at least one monitoring unit (Block 206). The processor executes a third programmable code portion for calculating a location of the locating circuit using the determined duration of transmission time of the omnidirectional signal (Block 208). The processor may also execute a fourth programmable code portion for initiating an alarm system when the calculated location of the locating circuit is at a predetermined location (Block 210).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computerized device for use with an object location system comprising:
   at least one processor in communication with at least one memory device, the memory device storing a quantity of programmable code having a plurality of processor-executable instructions;
   a communication element connected between the processor and at least one monitoring unit, wherein the at least one monitoring unit is positioned remote from the computerized device, and wherein a locating circuit substantially secured to an object intermittently communicates an omnidirectional signal to the at least one monitoring unit; and
   a calculator in communication with the processor, wherein the calculator directs the processor to determine a duration of transmission time of the omnidirectional signal communicated from the locating circuit to the at least one monitoring unit and further directs the processor to calculate a location of the locating circuit using the determined duration of transmission time of the omnidirectional signal.

2. The computerized device of claim 1, further comprising a graphical user interface (GUI) in communication with the processor.

3. The computerized device of claim 2, wherein the GUI displays an image of at least one of a navigatable structure and a navigatable terrain, wherein the calculated location of the locating circuit is displayed on the image of at least one of the navigatable structure and the navigatable terrain, respectively.

4. The computerized device of claim 1, further comprising a control unit directing the processor to execute at least a portion of the quantity of programmable code.

5. The computerized device of claim 4, wherein the control unit directs the processor to monitor a battery life of at least one battery within the locating circuit.

6. The computerized device of claim 4, further comprising an alarm system in communication with the processor, wherein the control unit directs the processor to initiate the alarm system when the calculated location of the locating circuit is in a predetermined location.

7. The computerized device of claim 4, further comprising a log memory at least partially within the memory device, wherein the control unit directs the processor to record at least one activity of the locating circuit within the log memory.

8. The computerized device of claim 4, wherein the control unit directs the processor to:
   store the calculated location of the locating circuit;
   calculate a second location of the locating circuit, wherein the second location is calculated subsequent to storing the calculated location of the locating circuit; and
   display the calculated location of the locating circuit and the second calculated location of the locating circuit on a GUI.

9. The computerized device of claim 4, further comprising:
   a plurality of locating circuits, each substantially secured to a plurality of objects, wherein each of the plurality of locating circuits intermittently communicates an omnidirectional signal to the at least one monitoring unit, wherein each of the plurality of locating circuits includes an associated identifying characteristic; and
   a selection element in communication with the control unit, wherein the control unit directs the processor to display the associated identifying characteristic of at least a portion of the plurality of locating circuits based on an input in the selection element.

10. A method for controlling an object location system with a computerized device, the method comprising the steps of:
   connecting a communication element between a processor and at least one monitoring unit, wherein the processor is in communication with a memory device;
   storing a quantity of programmable code within the memory device, wherein the quantity of programmable code has a plurality of processor-executable instructions;
   intermittently communicating an omnidirectional signal from at least one locating circuit substantially secured to an object to the at least one monitoring unit, wherein the at least one monitoring unit is positioned remote from the computerized device;
   directing the processor to determine a duration of transmission time of the omnidirectional signal communicated from the locating circuit to the at least one monitoring unit; and
   directing the processor to calculate a location of the locating circuit using the determined duration of transmission time of the omnidirectional signal.

11. The method of claim 10, further comprising the step of displaying the calculated location of the locating circuit on a graphical user interface (GUI).

12. The method of claim 10, further comprising the step of directing the processor to monitor a battery life of at least one battery within the locating circuit.

13. The method of claim 10, further comprising the step of directing the processor to initiate an alarm within an alarm system when the calculated location of the locating circuit is in a predetermined location, wherein the alarm system is in communication with the processor.

14. The method of claim 10, further comprising the step of recording an activity of the locating circuit within a log memory, wherein the log memory is at least partially within the memory device.

15. The method of claim 10, further comprising the steps of:
storing the calculated location of the locating circuit;
calculating a second location of the locating circuit, wherein the second location is calculated subsequent to storing the calculated location of the locating circuit; and
displaying the calculated location of the locating circuit and the second calculated location of the locating circuit on a GUI.

16. The method of claim 10, further comprising the steps of:
providing a plurality of locating circuits, each substantially secured to a plurality of objects, wherein each of the plurality of locating circuits intermittently communicates an omnidirectional signal to the at least one monitoring unit, wherein each of the plurality of locating circuits includes an associated identifying characteristic; and
directing the processor to display the associated identifying characteristic of at least a portion of the plurality of locating circuits based on an input in the selection element, wherein the selection element is in communication with the control unit.

17. The method of claim 10, further comprising the steps of:
providing a plurality of locating circuits, each substantially secured to a plurality of objects, wherein each of the plurality of locating circuits intermittently communicates an omnidirectional signal to the at least one monitoring unit, wherein each of the plurality of locating circuits includes an associated identifying characteristic;
matching at least a first of the plurality of locating circuits with at least a second the plurality of locating circuits by associating an identification of the first of the plurality of locating circuits with an identification of the second of the plurality of locating circuits; and
recording the matched first and second locating circuits within the memory device.

18. The method of claim 10, further comprising the steps of:
associating a time stamp of at least one of a manufacturing date, a shipping date, an activation date, and an expiration date on the locating circuit; and
storing the associated time stamp within the memory device.

19. A method using a programmable system for locating an object comprising the steps of
providing a processor in communication with a memory device, the processor executing a quantity of programmable code portions stored at least partially within the memory device;
executing with the processor a first programmable code portion for initiating a communication connection between the processor and at least one monitoring unit;
executing with the processor a second programmable code portion for determining a duration of transmission time of an omnidirectional signal communicated from a locating circuit to the at least one monitoring unit; and
executing with the processor a third programmable code portion for calculating a location of the locating circuit using the determined duration of transmission time of the omnidirectional signal.

20. The method of claim 19, further comprising the step of executing with the processor a fourth programmable code portion for initiating an alarm system when the calculated location of the locating circuit is at a predetermined location.

* * * * *